United States Patent

Lewis

[15] 3,692,947

[45] Sept. 19, 1972

[54] TIME DIVISION SWITCHING SYSTEM CONFERENCE CIRCUIT

[72] Inventor: Theras Gordon Lewis, Boulder, Colo.

[73] Assignee: Bell Telephone Laboratories, Incorporated, Murray Hill, N.J.

[22] Filed: Dec. 21, 1970

[21] Appl. No.: 100,308

[52] U.S. Cl. ............................................ 179/18 BC

[51] Int. Cl. ............................................ H04m 3/56

[58] Field of Search ........................ 179/18 BC, 1 CN

[56] References Cited

UNITED STATES PATENTS 3,319,005 5/1967 Gaunt, Jr. .......... 179/18 BC X 3,604,855 9/1971 Pommerening........ 179/18 BC

*Primary Examiner*—Thomas W. Brown

*Attorney*—R. J. Guenther and James Warren Falk

[57] ABSTRACT

In a time division switching system having first and second groups of storage devices, a plurality of first and second group storage devices, are conferenced by first detecting the difference between the signals on selected pairs of first and second group conference storage devices in a first plurality of successive time slots in a cycle. The detected signal differences are summed and stored; and in a second group of successive time slots, a signal is applied to each first group conference storage device for a time corresponding to the difference between the first group conference storage device and the sum signal. A signal is also applied to each second signal group conference storage device in said second group of successive time slots for a time corresponding to the difference between the signal on the second group conference storage device and the sum signal.

12 Claims, 9 Drawing Figures

INVENTOR
T. G. LEWIS
BY [signature]
ATTORNEY

STATION TIMING CIRCUIT

TIME DIVISION SWITCHING SYSTEM CONFERENCE CIRCUIT

BACKGROUND OF THE INVENTION

My invention relates to signal transfer system, more particularly to time division switching systems employing variable duration active energy transfer arrangements, and more particularly to conferencing arrangements in such time division switching systems.

Time division switching systems permit simultaneous exchange of information between selectively connected active terminals over a common communication link. Each information exchange between a pair of terminals occurs in a selected recurring interval or time slot of a repetitive group of time slots. During each scan of the time slot group, pairs of active terminals are connected in sequence to the common link in preassigned sequential time slots. In one time slot a channel is provided between a pair of selected terminals; the information at each terminal assigned to the connection is sampled; and the sampled information is exchanged between the selected terminals over the common link. The common link is available to other connections during the remaining time slots of the scan. As is well known in the art, the sampling rate may be selected to provide an accurate transfer of signals between selectively connected terminals.

In generally known time division switching systems, the time slots are of fixed duration regardless of the quantity of energy exchanged between connected terminals. The time slot duration is selected to allow the transfer of the maximum expected energy. Where speech and other types of audio signals are transferred between active terminals, it is known that the amount of energy transferred in a time slot is variable and that the maximum energy transfer is required only during a very small number of time slots. In a speech connection, for example, a terminal pair may be silent for a considerable portion of the conversation time. Thus, the average amount of speech energy exchanged during the fixed time slot period is much smaller than the maximum energy. Consequently, a time division switching arrangement utilizing constant duration time slots is not used in an efficient manner.

The communication link between active terminals comprises a plurality of high speed switches, each of which has a finite resistance that contributes to the attenuation of the energy being transferred. In resonant energy transfer multiplex arrangements, the switch resistance may result in appreciable signal losses. Some priorly known time division switching systems include an amplifier arrangement which operates to provide additional energy during the information transfer to offset switch losses. The amplifier arrangement, however, usually results in greater equipment complexity and the addition of further controls.

The aforementioned difficulties have been overcome in a time division switching system wherein the time slot duration is not fixed but varies in accordance with the actual energy exchange and wherein constant current signals are employed to minimize switching losses. Such a time division switching system is disclosed for example in the copending patent application of Dimmick, Lewis and O'Neill, application Ser. No. 27892, filed Apr. 13, 1970, now U.S. Pat. No. 3,629,839, issued Dec. 21, 1971, assigned to the same assignee. In this type of time division switching arrangement, there are first and second groups of storage devices. During each time slot, the signal from a selected first group storage device is sampled and transferred to a first common bus and the signal from a selected second group storage device is sampled and transferred to a second common bus. The sampled signals on the buses are applied to a timing circuit which produces a pulse having a duration corresponding to the difference between the sampled signals. In response to the timing circuit pulse, one of first and second polarity constant current signals is applied to the selected first group storage device and the other of said first and second constant polarity signals is applied to the second group storage device for the duration of the timing circuit pulse. In this way, the time division switching arrangement operates to exchange signals between a pair of lines coupled to the selected first and second group storage devices. It is often required, however, to exchange signals among three or more lines on a time division basis, but the aforementioned variable duration time slot arrangement does not provide a conferencing hookup.

BRIEF SUMMARY OF THE INVENTION

In a time division switching system wherein a conference hookup is established between a plurality of first and second group storage devices, during each of a first group of immediately successive time slots the difference between a selected first group conference storage device and a selected second group conference storage device is detected. The detected signal differences are summed and the sum is stored. In each of a second group of immediately successive time slots, a signal is applied to a selected first group conference storage device for a time corresponding to the difference between the stored summed signal and the signal on the selected first group conference storage device and a signal is applied to a selected second group conference storage device for a time corresponding to the difference between the summed signal and the signal on the selected second group conference storage device. At the end of the second group of successive time slots, the summed signal less the storage device signal is contained in each conference storage device.

According to one aspect of the invention, the summed conference signals are formed in a first successive group of conference time slots in each repetitive cycle of time slots and the summed conference signal is distributed to the conference storage devices during a second successive group of time slots in the same repetitive cycle. The conference arrangement provides a complete exchange of signals among conference storage devices in each cycle.

According to another aspect of the invention, each conference subscriber is connected on a two-wire basis, and a pair of conference storage devices are connectable to the time division buses in each time slot whereby the number of conference time slots is reduced.

DETAILED DESCRIPTION OF THE INVENTION

Figure 1:
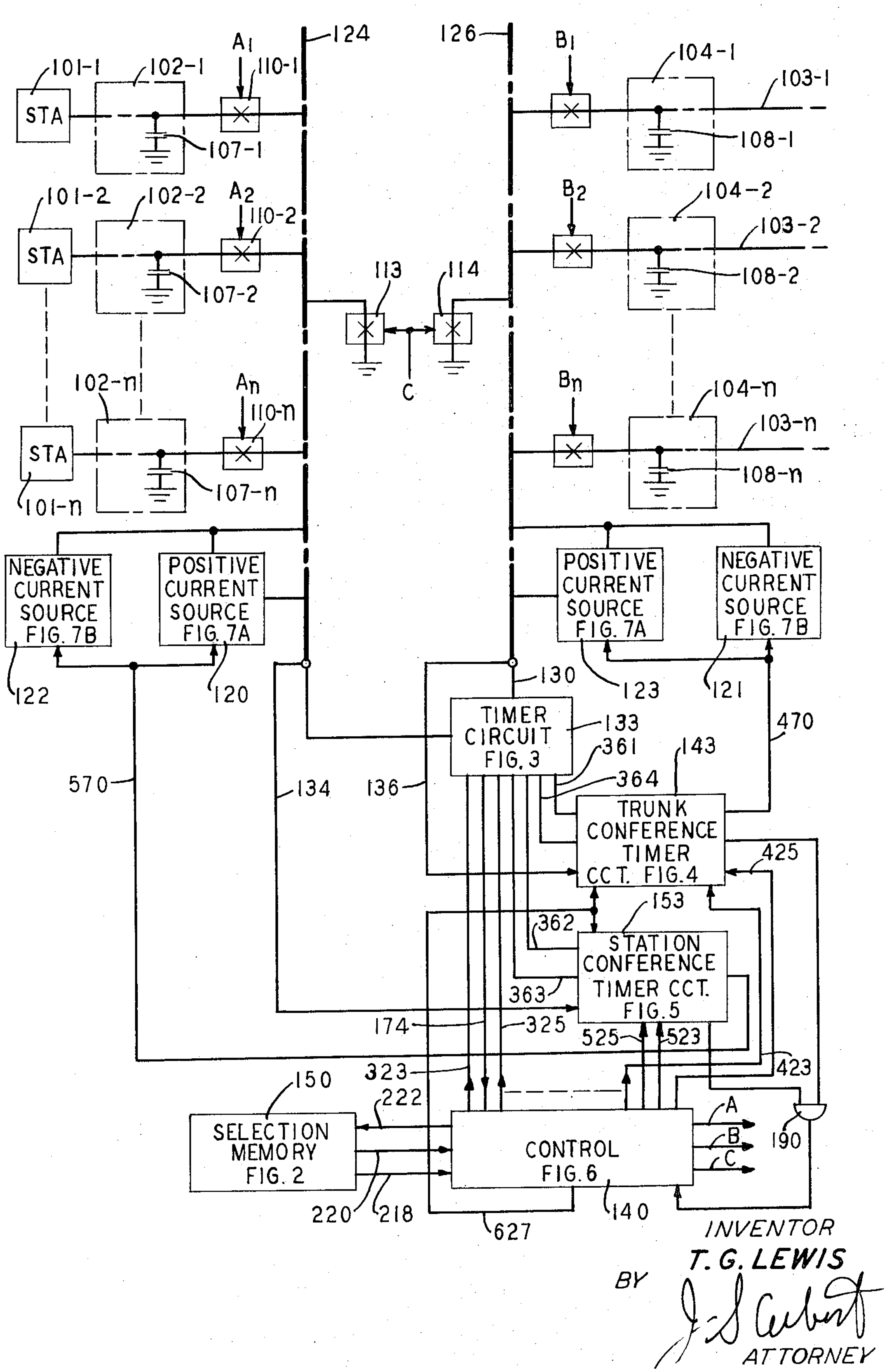
FIG. 1 depicts an illustrative embodiment of my invention.

FIG. 1 shows an embodiment illustrative of my invention in which a group of stations 101-*n* are coupled to common bus 124 via filter circuits 102-1 through 102-*n* and gates 110-1 through 110-*n*. Each of filter circuits 102-1 through 102-*n* includes a storage capacitor of capacitors 107-1 through 107-*n*. Trunks 103-1 through 103-*n* are coupled to common bus 126 via filter circuits 104-1 through 104-*n* and gates 111-1 through 111-*n*.

Figure 6:
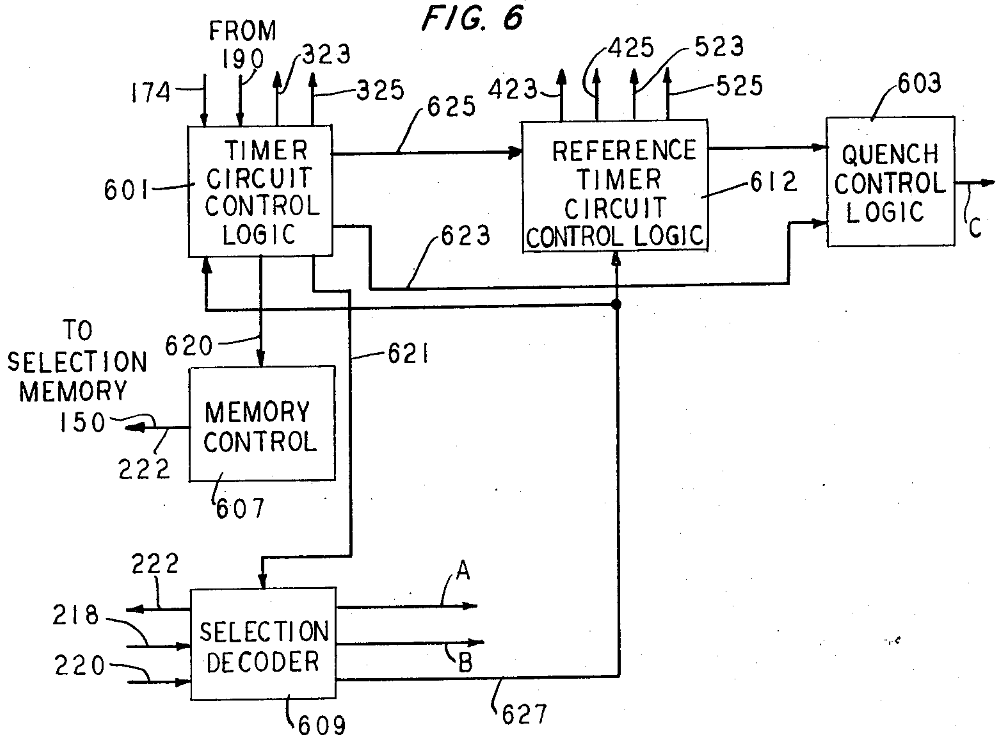
FIG. 6 shows a control circuit useful in the embodiment of FIG. 1.

Each trunk filter circuit includes one of storage capacitors 108-1 through 108-*n*. Buses 124 and 126 are connected to timer circuit 133 via leads 130 and 131. Bus 124 is also connected to station conference timer circuit 133 via lead 134 and bus 126 is connected to trunk conference timer circuit 143 via lead 136. A positive current source 120 and a negative current source 122 are connected to bus 124 and a separate positive current source 123 and a negative current source 121 are connected to bus 126. Selection memory 150 operating with selection decoder 609 in control 140 determines which of gating circuits 110-1 through 110-*n* and 111-1 to 111-*n* are opened in each time slot. Control 140 which is shown in detail in FIG. 6 is operative to control the sequence of operations related to signal exchanges between the storage capacitors during each time slot.

Assume for purposes of illustration that a conference hookup is established between stations 101-1, 101-2 and trunks 103-1 and 103-2. In this event, a first set of successive time slots is assigned to the conference hookup so that the signal contributions of capacitors 107-1, 107-2, 108-1 and 108-2 may be summed. A second set of successive time slots is assigned to the conference hookup so that the summed contributions may be distributed to the conference capacitors. Assume that the signal voltage on capacitor 107-2 ($V_{72}$) is 1 volt and that the signal on each of capacitors 108-1 ($V_{81}$) and 108-2 ($V_{82}$) is 0 volts.

During the first conference time slot, storage capacitors 107-1 and 108-1 are connected to buses 124 and 126 respectively. The signal difference between capacitors 107-1 and 108-1 i.e., ($V_{71} - V_{81}$) is formed in timing circuit 133 and transferred by means of constant current charge to station conference timer circuit 153. The signal difference ($V_{81} - V_{71}$) is formed and transferred to trunk conference timer circuit 143 by means of constant current charge. In the next successive time slot, storage capacitors 107-2 and 108-2 are connected to buses 124 and 126 respectively and the signal difference ($V_{72} - V_{82}$) is transferred to timer circuit 153 while the signal difference ($V_{82} - V_{72}$) is transferred to timer circuit 143 via timer circuit 133. Thus, at the end of the second time slot, the sum of the conference signals is stored in both timer circuits 143 and 153. It should be noted that the sum signal stored in each of circuits 143 and 153 contain different phase components. As is well known in the art, however, phase differences in audio signals are not detectable by subscribers.

In the third time slot, the summed contributions are distributed to storage capacitors 107-1 and 108-1 by means of constant current transfers. The sum signal stored in timer circuit 153 at the beginning of the third time slot $V_s$ is ($V_{71} - V_{81} + V_{72} - V_{82}$) and the signal voltage on capacitor 107-1 is $V_{71}$. An amplifier arrangement in circuit 153 including amplifiers 558 and 501 develops a signal equal to $(V_s - V_{71}) - V_{71}$. Timing circuit 153 generates a pulse having a duration corresponding to $(V_s - V_{71}) - V_{71}$ and a constant current is applied to capacitor 107-1 for the duration of the timing circuit pulse. Since the signal voltage on capacitor 107-1 is $V_{71}$ initially and the change of voltage on capacitor 107-1 is $(V_s - V_{71}) - V_{71}$, the voltage on capacitor 107-1 upon the termination of the pulse from circuit 153 is $V_s - V_{71}$. Thus, the signal transfer to capacitor 107-1 results in the conference sum signal less the signal on capacitor 107-1 being placed thereon as desired. In like manner, timer circuit 143 operates to transfer the conference sum signal less the signal of capacitor 108-1 to capacitor 108-1. Circuit 143 generates a pulse having a duration corresponding to $V_{81} - (V_{s'} - V_{81})$, where $V_{s'} = -V_s$. This pulse controls the application of a constant current signal to capacitor 108-1. At the termination of the pulse from circuit 143, the signal voltage on capacitor 108-1 is $V_s - V_{81}$ which corresponds to the conference sum less the signal voltage on capacitor 108-1. It can readily be seen that during the fourth time slot, signal transfers are made to capacitors 107-2 and 108-2 so that the conference circuit signal exchange is complete. At the end of the fourth time slot, the sum voltages in circuits 143 and 153 are removed.

Figure 2:
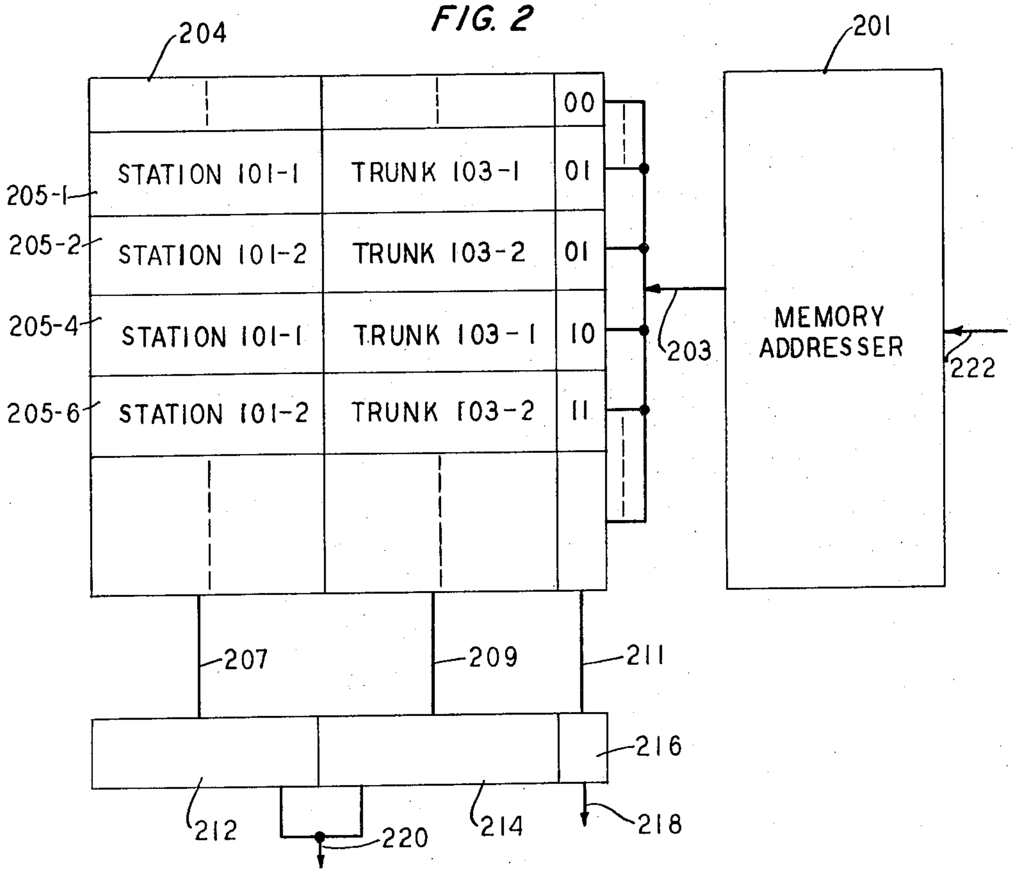
FIG. 2 shows a selection memory useful in the embodiment of FIG. 1.

At the beginning of the first conference time slot of each repetitive cycle, the output of memory cell 205-1 is stored in registers 212, 214 and 216 of FIG. 2. The address of station 101-1 is stored in register 212, the address of trunk 103-1 is stored in register 214 and a conference indicating code from cell 205-1 is stored in register 216. The conference indicating code is a two bit code 01 which is sent to control 140 via lead 218 and decoded in decoder 609 so that a signal is sent via cable 627 to current sources 450 and 452 in timer circuit 143 and current sources 550 and 552 in timer circuit 553. In this way, a conference hookup sequence is started.

Figure 8:
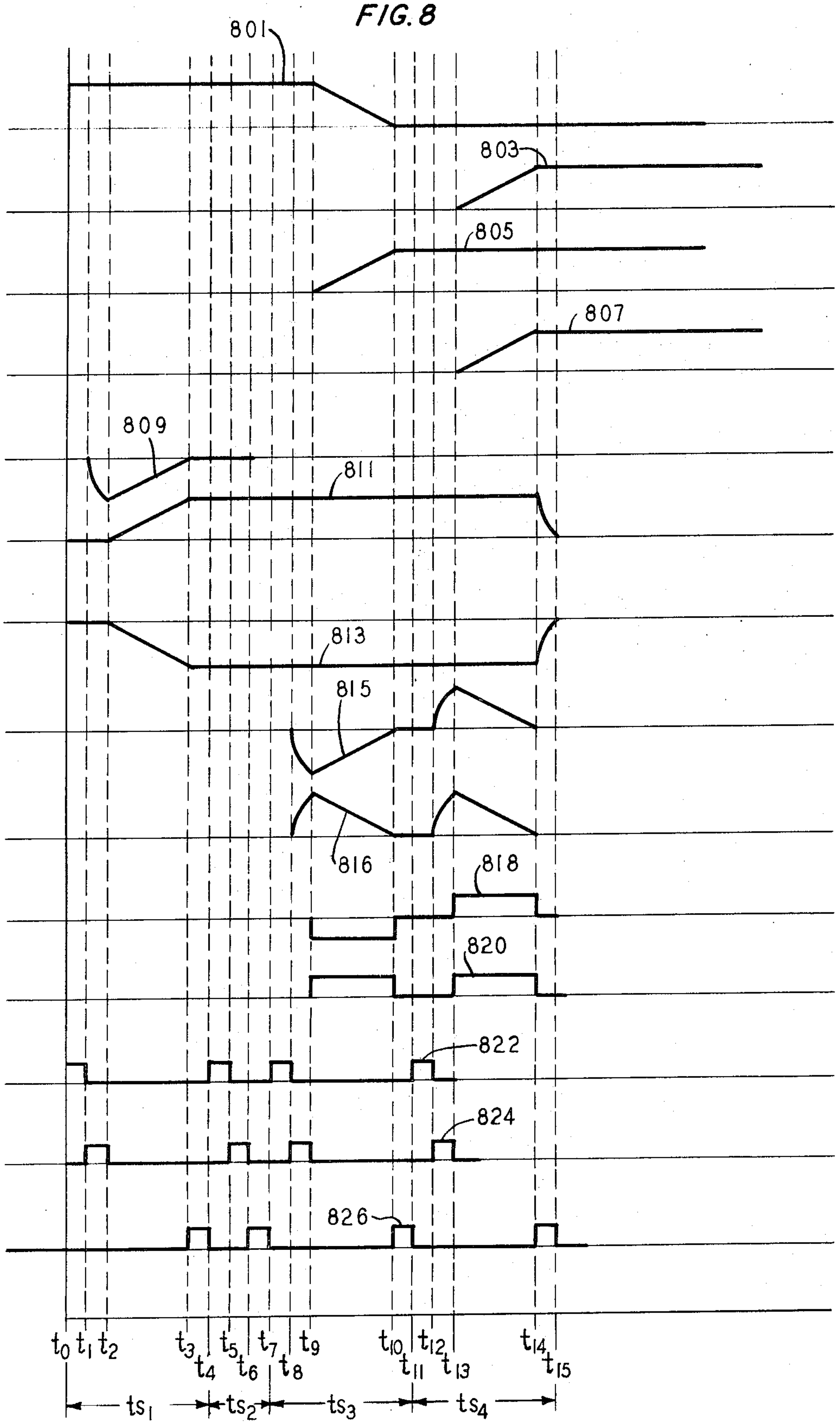
FIG. 8 shows waveforms useful in describing the operation of the embodiment of FIG. 1.

As illustrated in waveform 822 of FIG. 8, a select signal is applied from control 140 to memory 150 via lead 222 between time $t_0$ and $t_1$. This select signal causes contents of the memory registers illustrated in FIG. 2 to be sent to control 140 via cables 220, 214 and 218. The addresses are decoded in selection decoder 609 of control 140 so that a signal $A_1$ is applied via cable A to gate 110-1 and a signal $B_1$ is applied via cable B to gate 111-1. The $A_1$ and $B_1$ signals open gates 110-1 and 111-1 respectively whereby capacitor 107-1 is connected to bus 124 and capacitor 108-1 is connected to bus 126.

Figure 3:
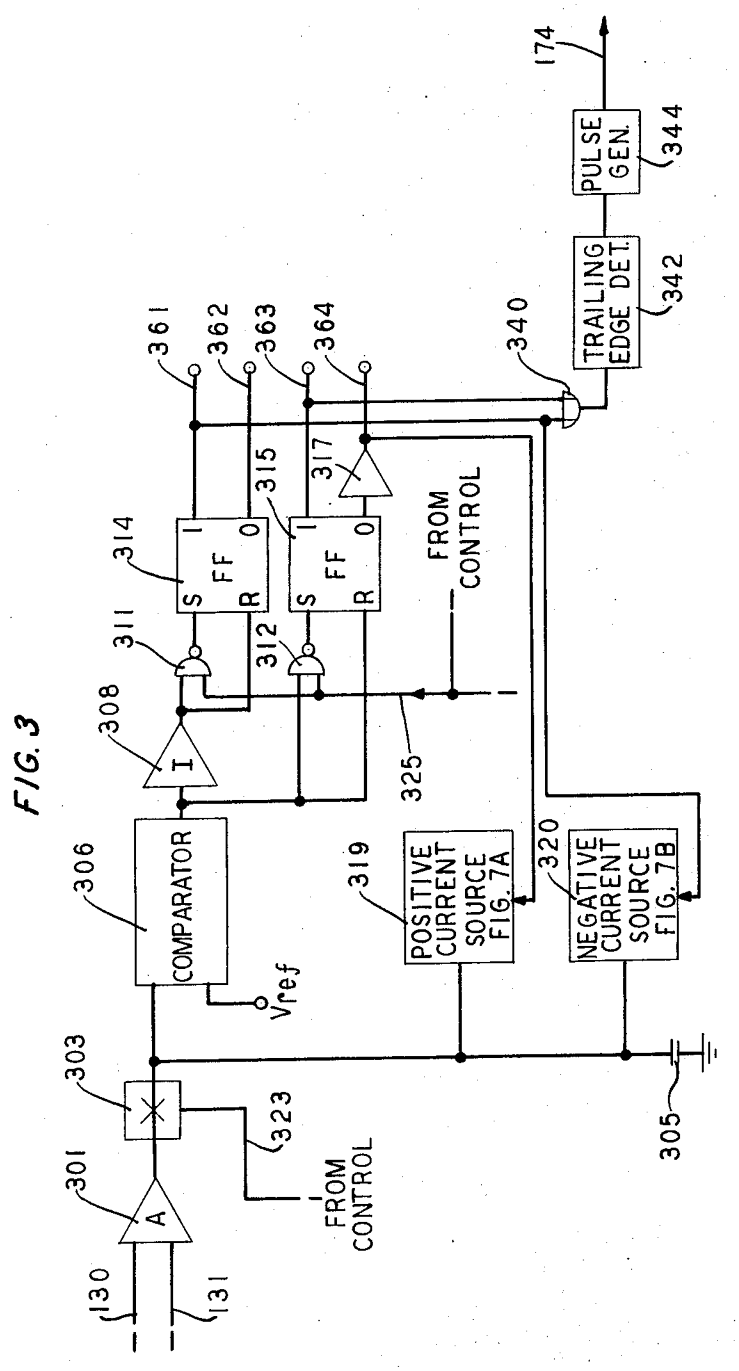
FIG. 3 shows a timer circuit useful in the embodiment of FIG. 1.

During time slot $ts_1$ on FIG. 8, timer circuit 133 illustrated in FIG. 3 operates to provide a pulse having a duration corresponding to the difference between the sampled signals from capacitors 107-1 and 108-1. The signal from capacitor 107-1 is applied to difference amplifier 301 via lead 131 and the signal from capacitor 108-1 is applied to amplifier 301 via lead 130. Between times $t_1$ and $t_2$ a sample signal, illustrated in waveform 824, is sent from timer control logic circuit 601 of control 140 via lead 323 to gate 303. The sample signal of waveform 824 opens gate 303 so that the difference between the sampled signals from capacitors 107-1 and 108-1 obtained from amplifier 301 are stored in capacitor 305. The signal in timing circuit capacitor 305 is illustrated in waveform 809. Since capacitor 107-1 contained a plus one volt signal as illustrated in waveform 801 and capacitor 108-1 contained a zero voltage signal as illustrated in waveform 803 at time $t_1$, capacitor 305 is charged to a −1 volt signal at time $t_2$.

The voltage on capacitor 305 is applied to comparator 306 wherein it is compared to a reference voltage Vref. The negative voltage on capacitor 305 at time $t_2$ causes the output of comparator 306 to assume a high logic level. This high logic level is applied to inverter 308 and to gate 312. The output of inverter 308 at time $t_2$, is a low logic level which is applied to gate 311. At time $t_2$, a high level signal is applied from timer circuit control logic 601 of control 140 via lead 325. This high level signal in combination with the high level signal from comparator 306 opens gates 312 so that flip-flop 315 is set. Gate 311 is not opened at this time because the output of inverter 308 is low. When flip-flop 315 is set, a high level signal is obtained on lead 363 and a low level signal is obtained on lead 364. The zero output of flip-flop 315 is also applied via non-inverting amplifier 317 to positive current source 319. Current source 319 charges capacitor 305 between times $t_2$ and $t_3$. At time $t_3$, the voltage on capacitor 305 is equal to the reference voltage; comparator 306 reverses state; and the low logic level signal from comparator 306 resets flip-flop 315.

During conference time slot $ts_1$, the high level one output of flip-flop 315 is applied via lead 363 to negative current source 552. Negative current source 552 charges summing capacitor 554 as illustrated in waveform 813 so that the signal voltage on capacitor 554 is −1 volt at time $t_3$. The low level zero output of flip-flop 315 is applied to positive current source 450 via lead 364. This current source charges summing capacitor 454 as shown in waveform 811 whereby the signal voltage on capacitor 434 at time $t_3$ is +1 volt. At $t_3$, the resetting of flip-flop 315 enables gate 340, detector 342 and pulse generator 344 so that a signal is sent to control 140 from generator 344. Control 140, in turn, enables gates 113 and 114 via cable C to quench buses 124 and 126 between times $t_3$ and $t_4$. During time slot $ts_1$, storage capacitors 107-1 and 108-1 have been selected, the voltages therefrom have been sampled, a signal corresponding to the signal difference between capacitors 107-1 and 108-1($V_{71} - V_{81}$) has been applied to capacitor 454, and a signal corresponding to the difference between capacitor 108-1 and 107-1 ($V_{81} - V_{71}$) has been applied to capacitor 554.

Between times $t_4$ and $t_5$ in time slot $ts_2$, capacitors 107-2 and 108-2 are connected to common buses 124 and 126 respectively in accordance with the contents of memory cell 205-2. The difference between the signals on storage capacitors 107-2 and 108-2 is applied to capacitor 305 in FIG. 3. Since capacitors 107-2 and 108-2 each has a zero signal, the voltage on capacitor 305 at time $t_5$ of the sampling period of time slot $ts_2$ is essentially at the reference voltage potential, whereby no charge is placed on either summing capacitors 454 or 554. The transfer during time slot $ts_2$ ends at time $t_6$, and a signal is sent via trailing edge detector 342 and pulse generator 344 between times $t_6$ and $t_7$ to quench buses 124 and 126 and to start the next time slot at time $t_7$.

Figure 4:
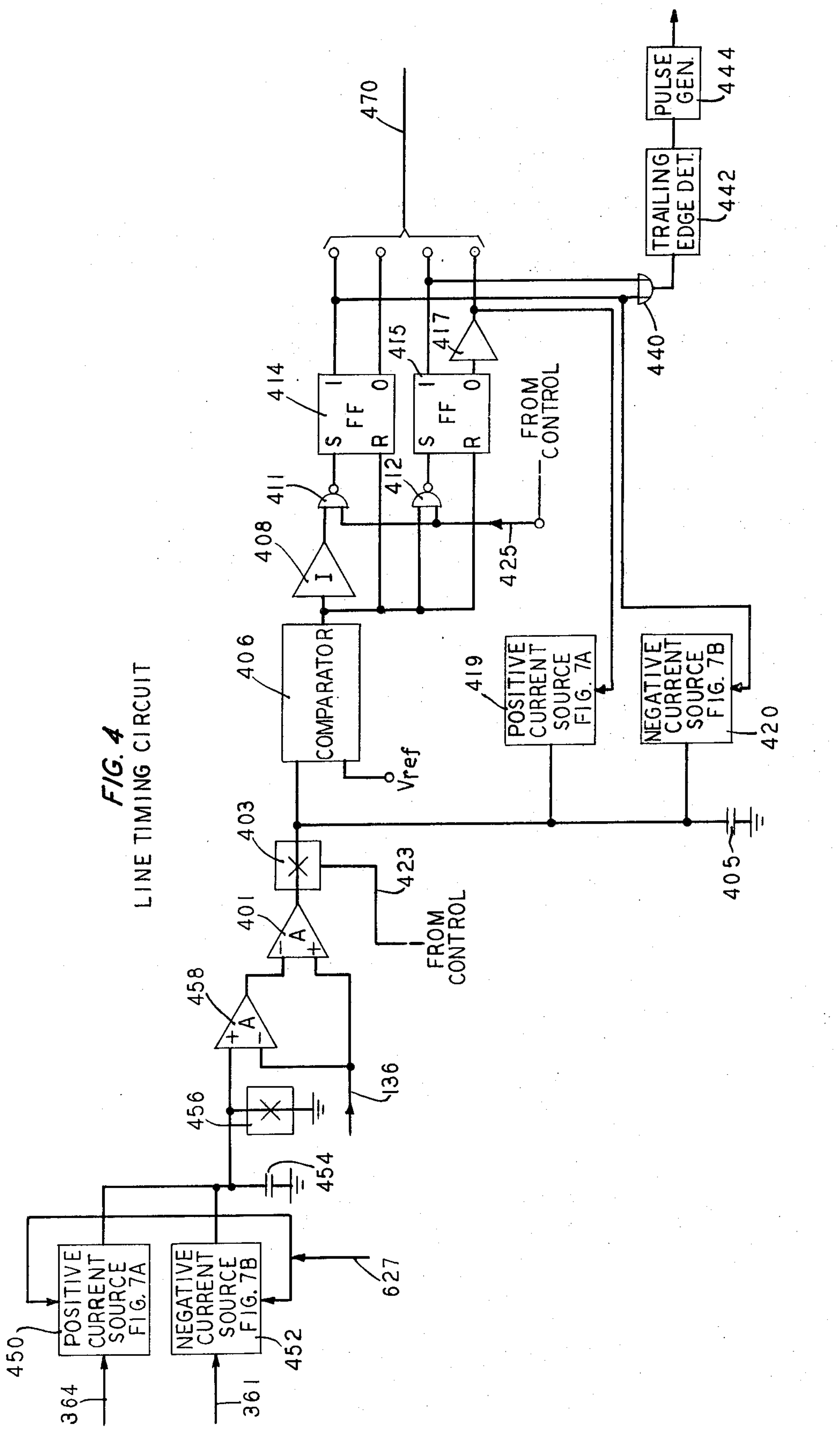
FIG. 4 shows a trunk conference timer circuit useful in the embodiment of FIG. 1.
Figure 5:
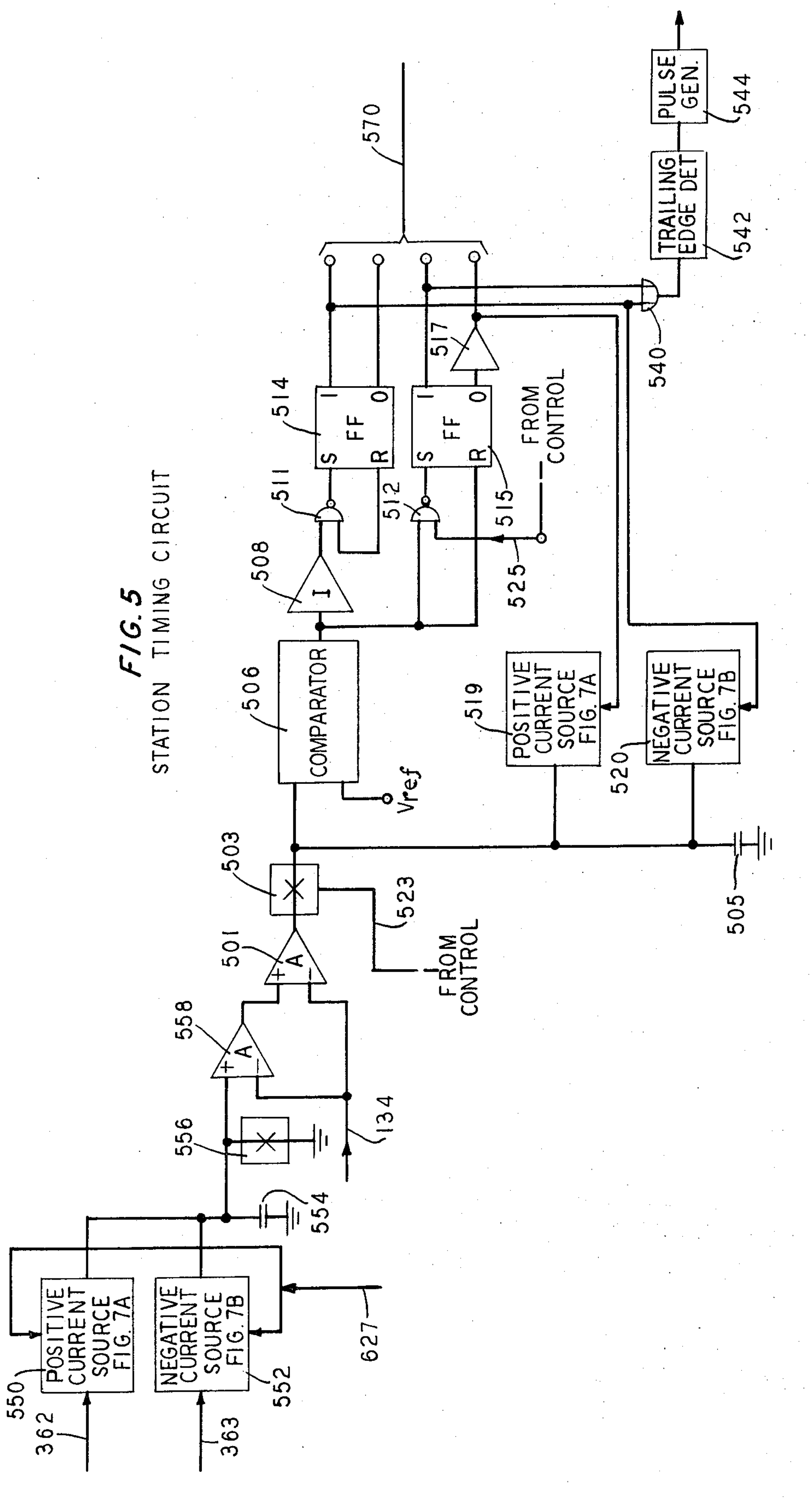
FIG. 5 shows a station conference timer circuit useful in the embodiment of FIG. 1.

The conference code of 10 at the beginning of time slot $ts_3$, is decoded in decoder 609 which provides a signal that prevents pulses from being applied to gate 303 of timer circuit 133 from control 140. Between times $t_7$ and $t_8$ of time slot $ts_3$, control signals from control 140 are sent to the timer circuits of FIGS. 4 and 5 via conference timer circuit control logic 612. The contents of memory cell 205-4 are applied to control 140 via cables 220 and 218 so that storage capacitors 107-1 and 108-1 to be connected to buses 124 and 126 via gates 110-1 and 111-1 respectively. During this time slot, the signal from capacitor 107-1 is applied to station conference timer circuit 153 via lead 134.

Differential amplifier 558 now operates to subtract the signal voltage on lead 134 from the signal voltage on summing capacitor 554. Since audio signal phase inversions are not detectable by the subscriber the output of amplifier 558 i.e., $V_s = (-V_{81} + V_{72} - V_{82})$ is a signal that corresponds to the contributions of all the conference storage capacitors, less that of capacitor 10-1. The output of amplifier 588 is then applied to differential amplifier 501 wherein the signal on capacitor 107-1 is subtracted from the conference sum less the signal from capacitor 107-1 ($V_s - V_{71}$). The output of amplifier 501 is then applied to capacitor 505 via gate 503 which is opened by a signal from conference timer control logic 612 of control 140 sent over lead 523. Between times $t_8$ and $t_9$, when gate 503 is opened, capacitor 505 is charged to −1 volt as illustrated in waveform 815.

During the time interval between $t_8$ and $t_9$, the signal from storage capacitor 108-1 is applied to amplifier 458 via lead 136. This signal, $V_{81}$, is subtracted from the signal from summing capacitor 454 i.e. ($V_{81} - V_{71} + V_{82} - V_{72}$) in amplifier 458 whereby the sum of all conference capacitors less than of capacitor 108-1 is obtained. Amplifier 401 operates to subtract the output of amplifier 458 from a signal on capacitor 108-1. Gate 403 is also opened between times $t_8$ and $t_9$ whereby capacitor 405 is charged to +1 volt at $t_9$ as indicated in waveform 816. It should be noted that the signal on capacitor 405 at time $t_9$ is equal in magnitude but of opposite polarity to that of capacitor 505 at this time.

Between times $t_9$ and $t_{10}$, the voltage on capacitor 505 is negative whereby comparator 506 provides a high logic level output. The high signal applied from control 140 to gates 511 and 512 between $t_9$ and $t_{10}$ via lead 525 combined with the high output of comparator 506 opens gates 512 to set flip-flop 515. The zero output from flip-flop 515 is applied to positive current source 519 via noninverting amplifier 517. Positive current source 519 causes capacitor 505 to be charged linearly until time $t_{10}$ when the output of capacitor 505 is equal to the reference voltage applied to comparator 506. During this time, a high logic level signal is sent from the one output of flip-flop 515 to negative current source 122 via cable 570. Negative current source 122 is enabled whereby capacitor 107-1 is linearly discharged between times $t_9$ and $t_{10}$. The constant current applied to capacitor 107-1 illustrated in waveform 818 is selected so that the change in voltage on this capacitor between $t_9$ and $t_{10}$ is the voltage on summing capacitor 554 less twice the voltage on capacitor 107-1. When this voltage change is subtracted from $V_{71}$ the result is $V_{72} - V_{81} - V_{82}$. Disregarding the phase differences, the resulting voltage is the sum of all other conference capacitor voltages. At time $t_{10}$, signal voltage on capacitor 107-1 is 0 volts. This signal voltage corresponds to the sum of all the other conference capacitor voltages as desired.

At time $t_9$, capacitor 405 has a positive voltage thereon corresponding to $V_{81}-(-V_{71}+V_{82}-V_{72})$ as indicated in waveform 816. This positive voltage provides a low output from comparator 406 whereby a high signal is applied to gate 411 via inverter 408 and a low signal is applied to gate 412. When a high level signal is applied to gate 411 from control 140 via lead 425, flip-flop 414 is set and negative current source 420 is enabled. Negative current source 420 then discharges capacitor 405 until time $t_{10}$ when the voltage on capacitor 405 is equal to the conference voltage applied to comparator 406. During this time interval, the zero output of flip-flop 414 is applied via cable 470 to positive current source 123. Positive current source 123 is then enabled to charge capacitor 108-1. The output of current source 123 is illustrated in waveform 820. At time $t_{10}$, positive current source 123 is disabled and capacitor 108-1 is charged to a plus one signal as indicated in waveform 805. The plus one signal on capacitor 108-1 at time $t_{10}$ corresponds to the sum of the outer conferences capacitors as desired.

At $t_{10}$, pulses are obtained from both pulse generators 444 and 544 which pulses enable gate 190. The output of gate 190 is then returned to timer control logic 601 of control 140. Logic 601 sends a signal to quenching control logic 603 which generates a quenching signal between times $t_{10}$ and $t_{11}$. A signal is also sent to memory control 607 from logic 601 to start the next time slot at $t_{11}$. The select signal on lead 621 between times $t_{11}$ and $t_{12}$ of time slot $ts_4$ operates via memory control 607 and decoder 609 of control 140 to close gates 110-2 and 111-2 whereby capacitors 107-2 and 108-2 are connected to buses 124 and 126 respectively.

In time slot $ts_4$, the conference code is 11, indicating the last conference time slot. During time slot $ts_4$, the output of differential amplifier 558 corresponds to the sum voltage from summing capacitor 554 less the signal on capacitor 107-2. The signal from capacitor 107-2 is subtracted from the output of amplifier 558 in differential amplifier 501. Between times $t_{12}$ and $t_{13}$, a signal from control 140 via lead 523 opens gate 503 whereby capacitor 505 is charged as indicated in waveform 815. The positive signal on capacitor 505 causes comparator 506 to provide a low level output whereby flip-flop 514 is set. Negative current source 520 is enabled so that capacitor 505 is linearly discharged as indicated in waveform 815 between times $t_{13}$ and $t_{14}$. At time $t_{14}$, flip-flop 514 is reset. The zero output of flip-flop 514 is connected via cable 570 to positive current source 120 between times $t_{13}$ and $t_{14}$, positive current source 120 is enabled and capacitor 107-2 is charged. The output of current source 120 on bus 124 is shown in waveform 818. At time $t_{14}$, capacitor 107-2 is charged to +1 volt which is the sum of the signals from all other conference capacitors.

Between times $t_{12}$ and $t_{13}$, the output of capacitor 108-2 is applied to amplifiers 458 and 401 via lead 136. The output of amplifier 458 corresponds to the sum of the conferenced storage capacitors less the signal from capacitor 108-2 and this output is subtracted from the signal from capacitor 108-2 in amplifier 401. Gate 403 is enabled from control 140 between times $t_{12}$ and $t_{13}$ whereby capacitor 405 is charged. Between times $t_{13}$ and $t_{14}$ the positive signal on capacitor 405 causes the output of comparator 406 to be low, whereby flip-flop 414 is enabled. The one output of flip-flop 414 enables negative current source 420 which discharges capacitor 405 between times $t_{13}$ and $t_{14}$ as indicated in waveform 816. During this interval, the zero output of flip-flop 414 is applied to positive current source 123 via capacitor 470 so that capacitor 108-2 is charged. The output of current source 123 on bus 126 is illustrated in waveform 820. At time $t_{14}$, capacitor 108-2 is charged to +1 volt as indicated in waveform 807. This voltage on capacitor 108-2 corresponds to the sum of all other conference signals. At time $t_{14}$, signals from generators 444 and 544 are applied to open gate 190 which in turn applies a signal to control 140 to quench buses 124 and 126 and to terminate the time slot. At this time, in response to the 11 code of memory cell 205-6, quenching gates 456 and 556 are opened to remove the signals on capacitors 454 and 554.

In the aforementioned example only one storage capacitor contains a non-zero signal. This corresponds to the normal conference hookup where one subscriber is active at a time. It is readily seen, however, that many subscribers may be concurrently active in the embodiment of FIG. 1.

Where a plurality of conference storage devices contain non-zero signals, it should be noted that the signal transfers to each storage device in a time slot is independent. Thus, in a particular time slot, the end of a signal transfer to a selected one of storage capacitors 107-1 through **107-*n* may occur at a different time than the end of the signal transfer to the selected one of capacitors 108-1 through 108-*n*. It should be further noted, that the memory cell arrangement shown in FIG. 2 may be modified so that only one set of conference time slot entries is required. Thus, in FIG. 2 memory cells 205-1 and 205-2** may be selected twice whereby only two memory cell locations are needed. This arrangement, of course, requires a modification of the conference code indication.

Figure 7A:
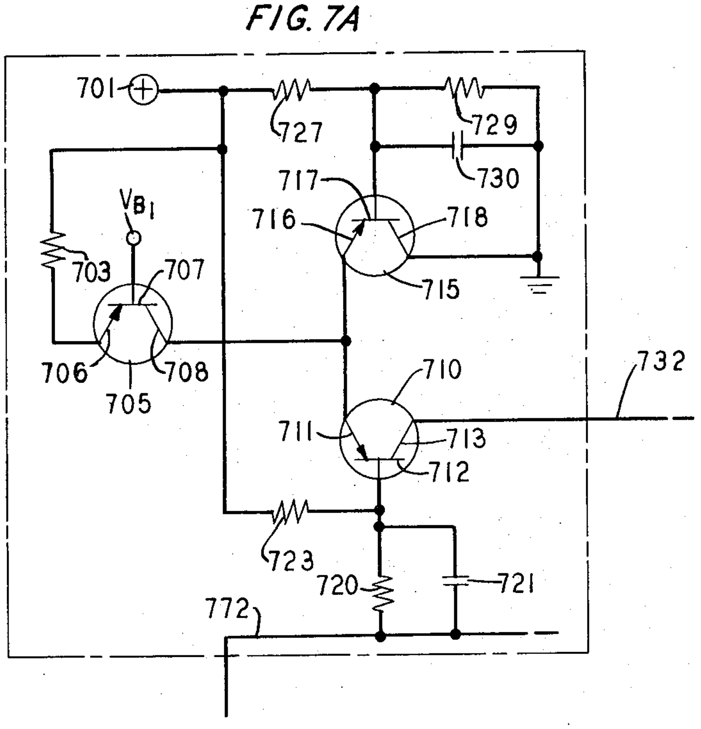
FIGS. 7A and 7B show current source circuits useful in the embodiment of FIG. 1.

The circuit shown in FIG. 7A may be incorporated in the positive current sources of FIGS. 1, 3, 4 and 5 to provide positive constant current. It is to be understood that other constant current circuit arrangements known in the art may also be used. Referring to FIG. 7A, emitter 706 of transistor 705 receives a predetermined current from the source including voltage source 701 and resistor 703. Base 707 is biased at voltage $V_{B1}$ so that transistor 705 is conducting with its collector base diode reverse biased. In this mode of operation, transistor 705 provides a constant current which normally flows into emitter 716 of transistor 715 since transistor 716 is normally turned on by means of the divider network connected to base 717. This divider network comprises resistors 727 and 729 which resistors are arranged so that the emitter-base diode of transistor 715 is forward biased. Capacitor 730 provides a bypass path to filter noise appearing on base 717.

Lead 772 is connected to a logic signal source so that a negative going input signal may be applied to base 712 of transistor 710 via the coupling network including resistor 720, capacitor 721, and resistor 723. This network is arranged to normally reverse bias base 712 in the absence of a negative going signal on lead 772. When a negative going signal is applied to lead 772, transistor 710 conducts and the constant current from collector 708 is applied to lead 732 via the emitter-collector path of transistor 710. When transistor 710 conducts, emitter 716 of transistor 715 is reverse biased and the current from transistor 705 is then applied to lead 732. This arrangement permits a positive constant current from a high impedance source to be generated.

Figure 7B:
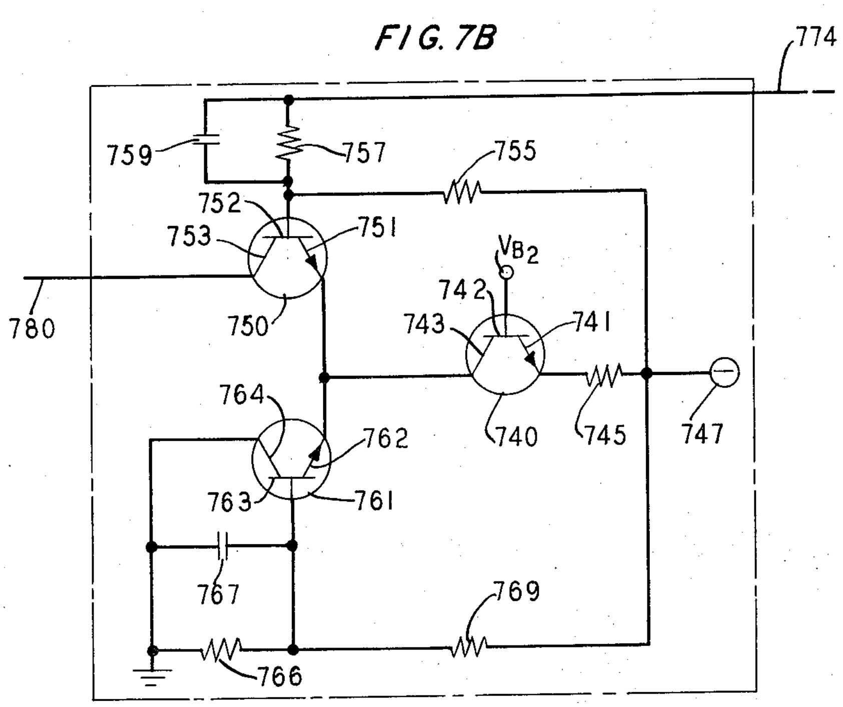

A negative constant current source is shown in FIG. 7B. The arrangement therein comprises transistor 761, 750 and 740. Negative voltage source 747 and resistor 745 provides a negative current for emitter 741 of transistor 740. The bias voltage $V_{B2}$ on base 742 causes transistor 740 to conduct so that the collector-base diode thereof is reverse biased. This provides a constant current to normally conducting transistor 761. The base network arrangement including negative source 747, resistors 769 and 766, and capacitor 767 forward biases the base emitter diode of transistor 761 so that this transistor conducts. This leaves transistor 750 in a nonconducting state. When a positive going pulse is applied to lead 774 from timer circuit 133 via cable 137, base 752 is made positive through the network including resistors 757, 755 and capacitor 759. The base-emitter diode of transistor 750 then conducts and the current from collector 743 is applied through the emitter-collector path of transistor 750 to lead 780. With transistor 750 conducting, transistor 761 is cut off. In this way a high impedance negative current source is provided. Current sources 120, 121, 122 and 123 are arranged to provide equal magnitude currents whereby the amount of charge transferred to the storage capacitors associated with buses 124 and 126 are controlled.

What is claimed is:

1. In a time division switching system having a plurality of communication paths wherein each path has a signal storage device associated therewith and wherein a plurality of time slots occur in repetitive cycles, a circuit for conferencing more than two communication paths comprising means for defining a first group of successive time slots, means for assigning a pair of conference path storage devices to each of said first group of successive time slots, means operative in each of said first group of successive time slots comprising means responsive to the signals in each of the conference path storage devices assigned to the occurring one of said first group of successive time slots for generating a signal corresponding to the difference between the signals from said assigned conference storage devices, means responsive to the generated signals in said first group of successive time slots for forming a signal corresponding to the sum of said generated signals, means for defining a second group of successive time slots, means for associating a pair of conference storage devices with each of said second group of successive time slots, means operative in the occurring one of said second group of successive time slots comprising means for producing a first signal corresponding to the difference between said formed signal and the signal in one of the associated conference storage devices, means for applying said first signal to said associated one conference storage device, means for producing a second signal corresponding to the difference between said formed signal and the signal on the other of said associated conference storage devices, and means for applying said second signal to said other associated conference storage device.

2. In a time division switching system having a plurality of communication paths wherein each path has a signal storage device associated therewith and wherein a plurality of time slots occur in repetitive cycles, a circuit for conferencing more than two communication paths according to claim 1 wherein said signal forming means comprises storing means and means operative in each of said first group of successive time slots for applying said generated signal to said storing means.

3. In a time division switching system having a plurality of communication paths wherein each path has a signal storage device associated therewith and wherein a plurality of time slots occur in repetitive cycles, a circuit for conferencing more than two communication paths according to claim 2 wherein said first signal applying means comprises means responsive to said first signal for producing a first pulse having a duration corresponding to said first signal, and means connected between said first pulse producing means and said one associated conference storage device for applying a first constant current signal to said one associated conference storage device for the duration of said produced first pulse, and said second signal applying means comprises means responsive to said second signal for producing a second pulse having a duration corresponding to said signal, and means connected between said second pulse producing means and said other associated conference storage device for applying a second constant current signal to said other associated conference storage device for the duration of said produced second pulse.

4. In a time division switching system wherein a plurality of time slots occur in repetitive cycles, the combination comprising first and second groups of communication paths, each communication path having an associated signal storage device, and a circuit for conferencing more than two of said first and second group communication paths, said conferencing circuit comprising means for defining a first plurality of successive time slots, means for assigning a first group storage device to be conferenced and a second group storage device to be conferenced to each of said first plurality of successive time slots, means operative in each of said first plurality of successive time slots responsive to the signals in the first group storage device and the second group storage device assigned to the occuring one of said first plurality of successive time slots for generating a signal corresponding to the difference between the signal in the assigned first group storage device and the signal in the assigned second group storage device, means responsive to the generated signal in each of said first plurality of successive time slots for forming a signal corresponding to the sum of said generated signals, means for defining a second plurality of successive time slots, means for associating one first group storage device to be conferenced and one second group storage device to be conferenced with each of said second plurality of successive time slots, means operative in each of said second plurality of successive time slots comprising means responsive to said formed signal and the signal in the associated first group storage device for producing a first signal corresponding to the difference between said formed signal and the signal in the associated first group storage device, means for applying said first signal to said associated first group storage device, and means responsive to said formed signal and the signal on the associated second group storage device for producing a second signal corresponding to the difference between said formed signal and said associated second group storage device, and means for applying said second signal to said associated second group storage device.

5. In a time division switching system, the combination in accordance with claim 4 wherein said signal forming means comprises storing means, and means responsive to the generated signal in each of said first plurality of successive time slots for applying said generated signal to said storing means.

6. In a time division switching system wherein a plurality of time slots occur in repetitive cycles, the combination in accordance with claim 5 further comprising a first common bus selectively connectible to said first group of storage devices, a second common bus selectively connectible to said second group of storage devices, means for connecting the assigned first group storage device to said first common bus and for connecting the assigned second group storage device to said second common bus in each of said first plurality of successive time slots, and means for connecting said first common bus and said second common bus to said signal generating means in each of said first plurality of successive time slots.

7. In a time division switching system wherein a plurality of time slots occur in repetitive cycles, the combination according to claim 6 wherein said first signal applying means comprises means responsive to said first signal for producing a first pulse having a duration corresponding to said first signal, means connected between said first pulse producing means and said first common bus responsive to said produced first pulse for generating a first constant current signal having the same duration as said produced first pulse, and means for applying said first constant current signal to said associated first group storage device via said first common bus, and wherein said second signal applying means comprises means responsive to said second signal for producing a second pulse having a duration corresponding to said second signal, means connected between said second pulse producing means and said second common bus responsive to said produced second pulse for generating a second constant current signal having the same duration as said produced second pulse, and means for applying said second constant current signal to the associated second group storage device via said second common bus.

8. In a time division switching system wherein a plurality of time slots occur in repetitive cycles, the combination comprising first and second groups of communication paths to be conferenced, each communication path having an associated storage device, first and second common buses, storing means, means for defining a first plurality of successive time slots, means for assigning a first group conference storage device and a second group conference storage device to each of said first plurality of successive time slots, apparatus operative in each of said first plurality of successive time slots comprising means for connecting the assigned first group conference storage device to said first bus and for connecting the assigned second group conference storage device to said second bus, means connected to said first and second buses for receiving a signal from said assigned first group conference storage device and a signal from said assigned second group conference storage device, and means connected to said receiving means for generating a signal corresponding to the difference between the signal from said assigned first group conference storage device and the signal from said assigned second group conference storage device and means for applying said generated signal to said storing means, said storing means being operative to accumulate the sum of said applied generated signals, means for defining a second plurality of successive time slots, means for associating a first group conference storage device and a second group conference storage device with each of said second plurality of successive time slots, and apparatus operative in each of said second plurality of successive time slots comprising means for connecting the associated first group conference storage device to said first bus, means for connecting the associated second group conference storage device to said second bus, means connected to said storing means and said first common bus for producing a first signal corresponding to the difference between the sum of said generated signals in said storing means and the signal in the associated first group conference storage device, means connected to said first bus responsive to said produced first signal for applying said produced first signal to the associated first group conference storage device via said first bus, means connected to said storing means and said second bus for producing a second signal corresponding to the difference between the sum of said generated signals in said storing means and the signal in said associated second group conference storage device, and means connected to said second bus responsive to said produced second signal for applying said second signal to said associated second group conference storage device via said second bus.

9. In a time division switching system wherein a plurality of time slots occur in repetitive cycles, the combination according to claim 8 wherein each first group communication path comprises a station and a bidirectional two-wire line for coupling said station to the corresponding first group storage device, and each second group communication path comprises a trunk connected to the corresponding second group storage device.

10. In a time division switching system wherein a plurality of time slots occur in repetitive cycles, the combination comprising a plurality of communication lines each having a signal storage device associated therewith, and a circuit for establishing a conference hookup among said plurality of lines, said conference circuit comprising storing means, means for defining a first group of successive time slots, means for assigning a pair of the plurality of line storage devices to each of said first group of successive time slots, apparatus operative in each of said first group of successive time slots comprising means for sampling the signals on the assigned pair of storage devices, means for linearly combining the sampled signals from said assigned pair of storage devices in each of said first group of time slots and means connected to said linearly combining means for applying a signal corresponding to said linearly combined sampled signals to said storing means, said storing means being operative to sum the signals from said linearly combining means, means for defining a second group of successive time slots, means for associating a pair of storage devices with each of said second group of successive time slots, and apparatus operative in each of a second group of successive time slots comprising means for sampling the signal on each of said associated pair of said plurality of storage devices, first means jointly responsive to the sum signal from said storing means and the sampled signal from one of said pair of storage devices for generating a first signal and means for applying said first signal to said one associated storage device, and second means jointly responsive to the sum signal from said storing means and the sampled signal from the other associated storage device for generating a second signal and means for applying said second signal to said other associated storage device.

11. In a time division switching system, the combination according to claim 10 wherein each storage device comprises a storage capacitor, said linearly combining means comprises means for forming a signal corresponding to the difference between the sampled signals from said assigned pair of said plurality of storage capacitors in each of said first group of time slots.

12. In a time division switching system, the combination according to claim 11 wherein said first means comprises means for generating a first pulse having a duration corresponding to the difference between the sum signal for said storing means and the sampled signal from said one associated storage capacitor, and means responsive to said generated first pulse for generating and applying a first constant current signal to said one associated storage capacitor for the duration of said first pulse, and wherein said second means comprises means for generating a second pulse having a duration corresponding to the difference between the sum signal from said storing means and the sampled signal from the other associated capacitor, and means responsive to said generated second pulse for generating and applying a second constant current signal to said other associated storage capacitor for the duration of said second pulse.

* * * * *